Oct. 27, 1970   L. A. DINE ET AL   3,536,390
COMBINATION COLLAPSIBLE PORTABLE VIEWER AND CARRYING CASE
Filed Feb. 14, 1968   4 Sheets-Sheet 4
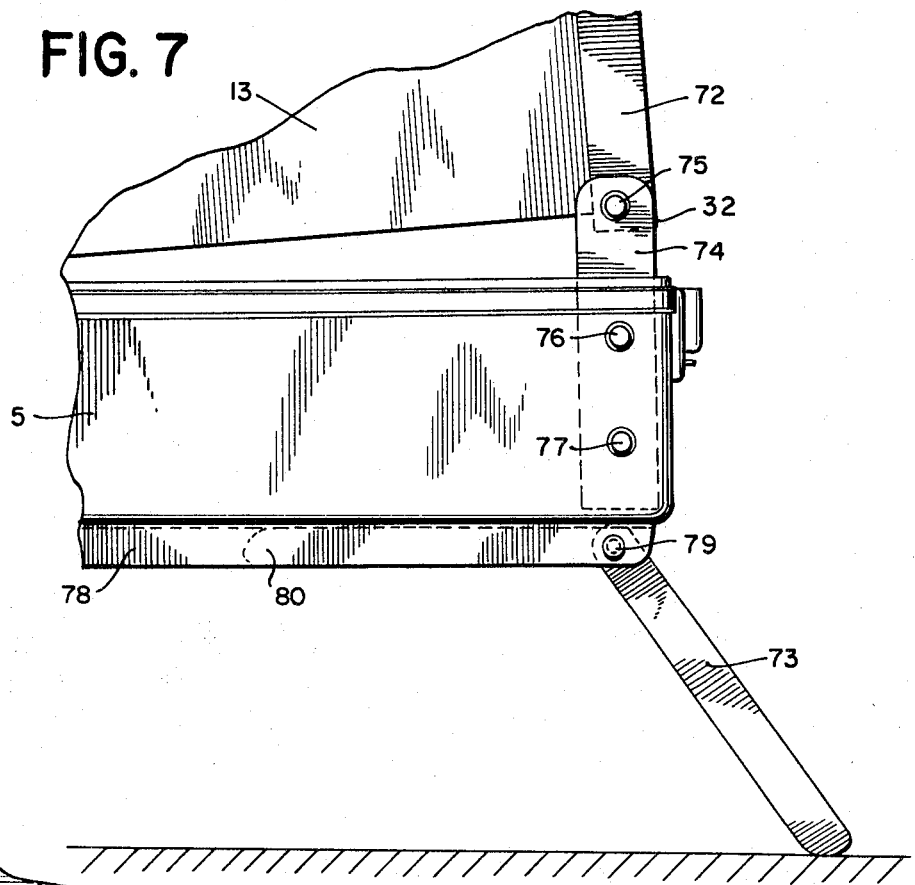
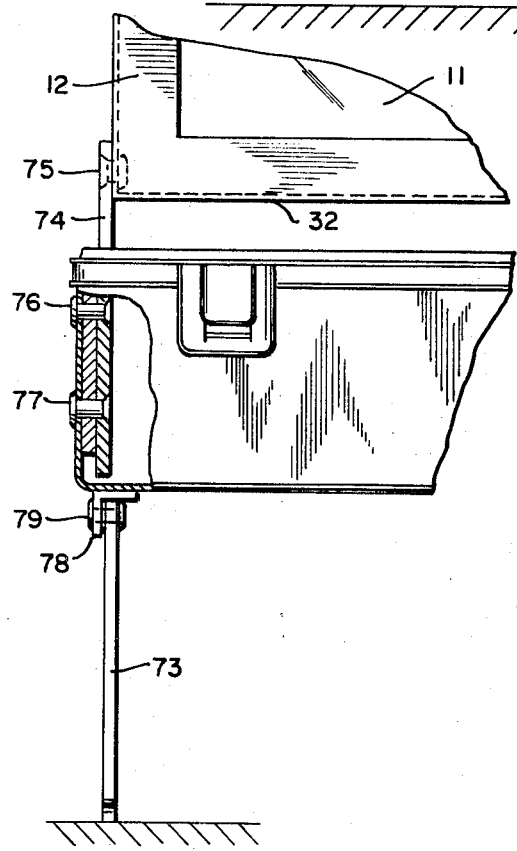
INVENTORS
LESTER A. DINE
EDGAR S. LEMMEY
BY *Darby & Darby*
ATTORNEYS 3,536,390
COMBINATION COLLAPSIBLE PORTABLE
VIEWER AND CARRYING CASE
Lester A. Dine, 145 Grist Mill Lane, Great Neck, N.Y.
11023, and Edgar S. Lemmey, 73 Lester Ave., Freeport, N.Y. 11520
Filed Feb. 14, 1968, Ser. No. 705,449
Int. Cl. G03b 21/28
U.S. Cl. 353—73                                                11 Claims

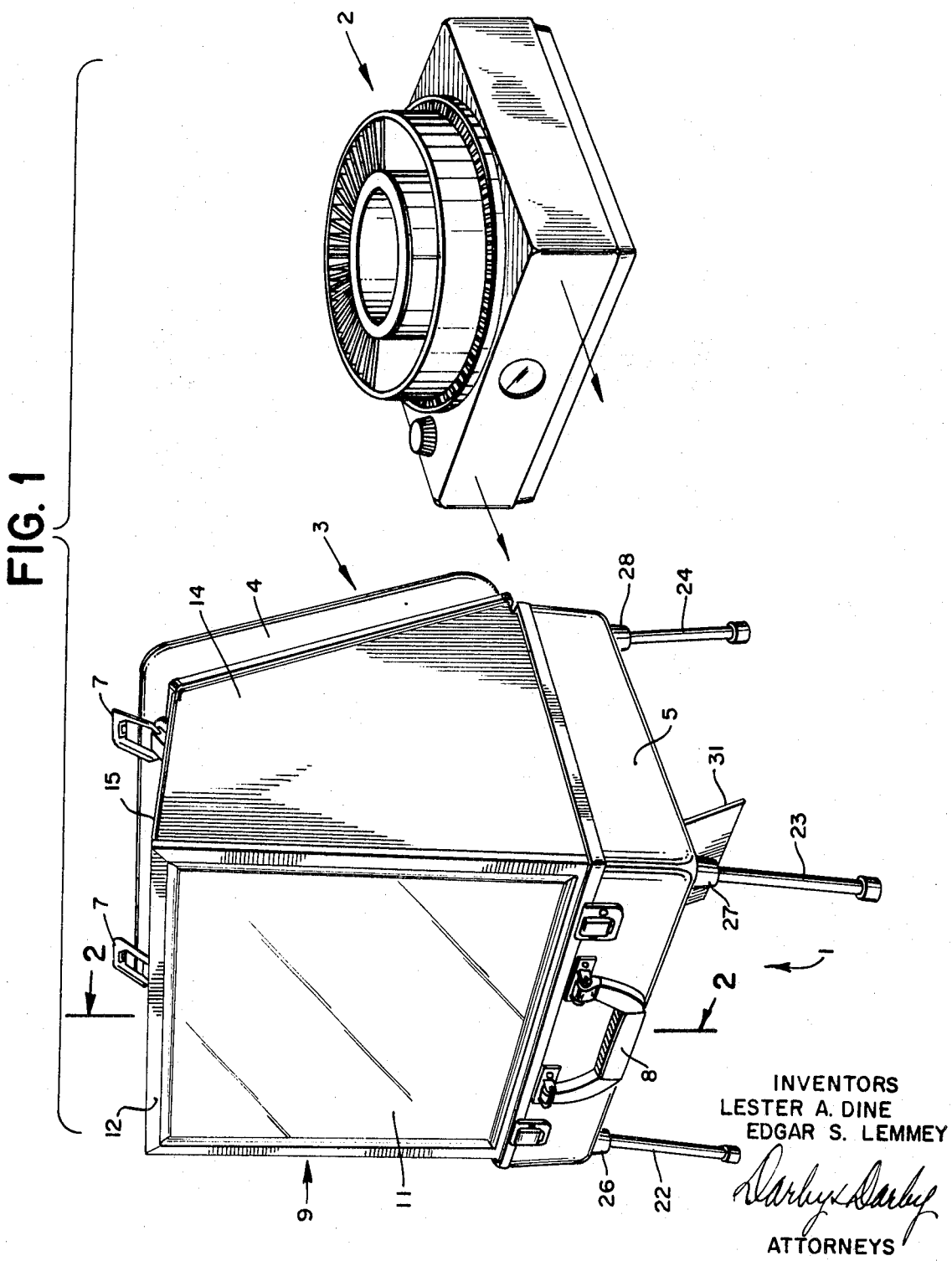

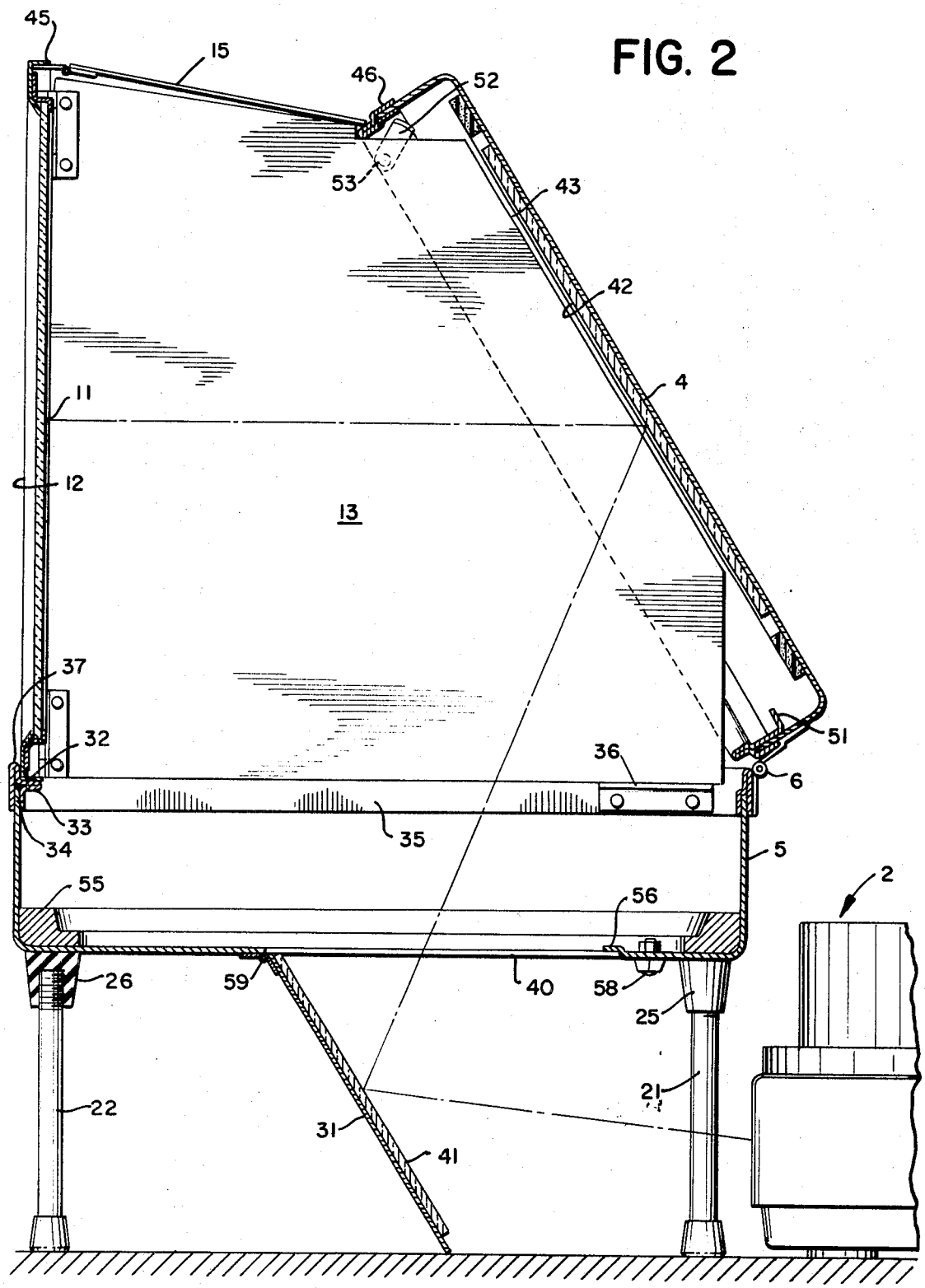

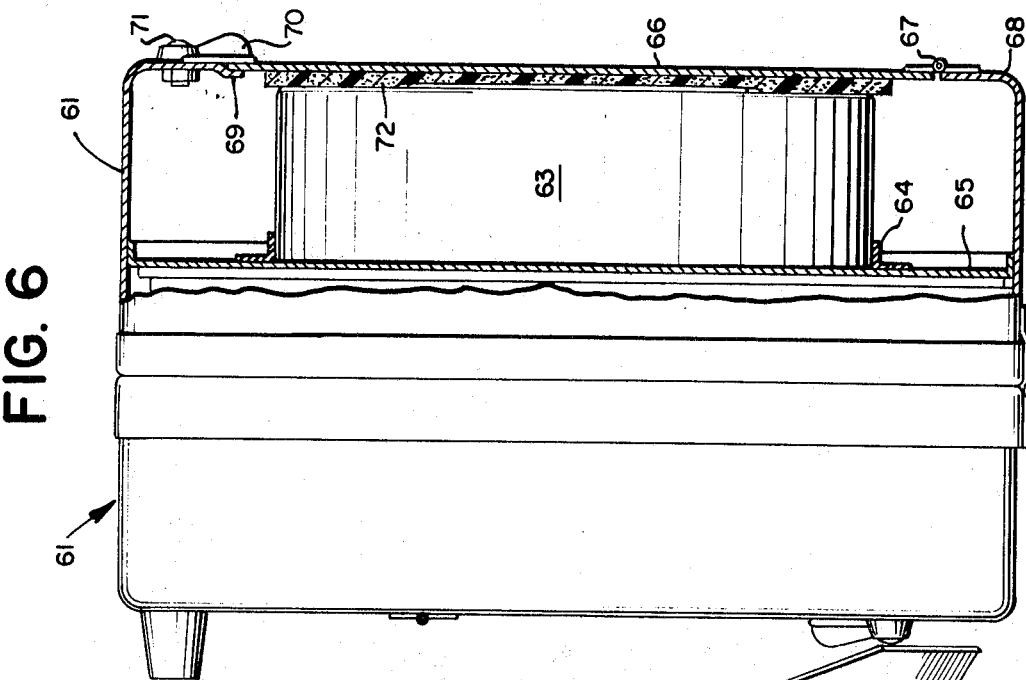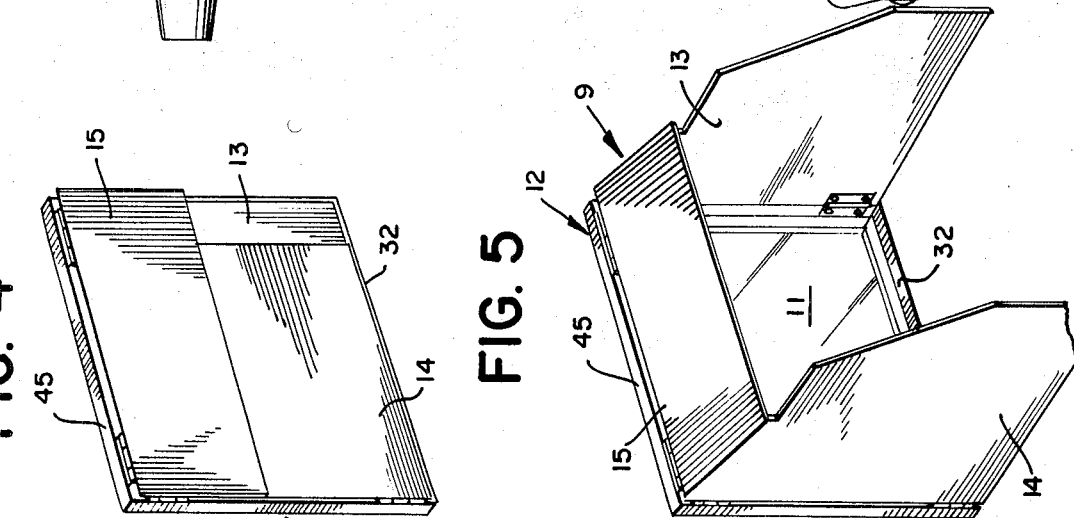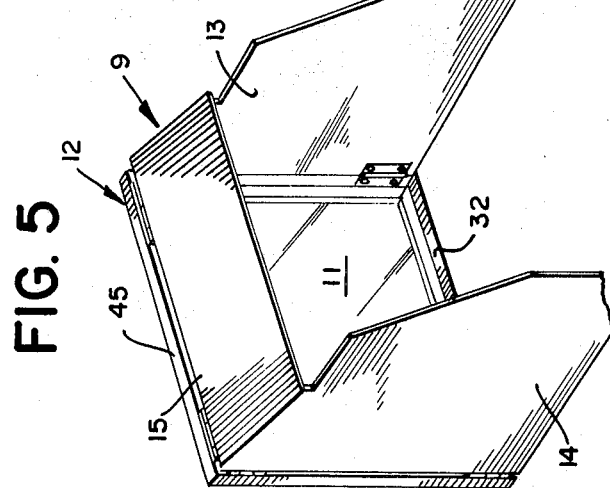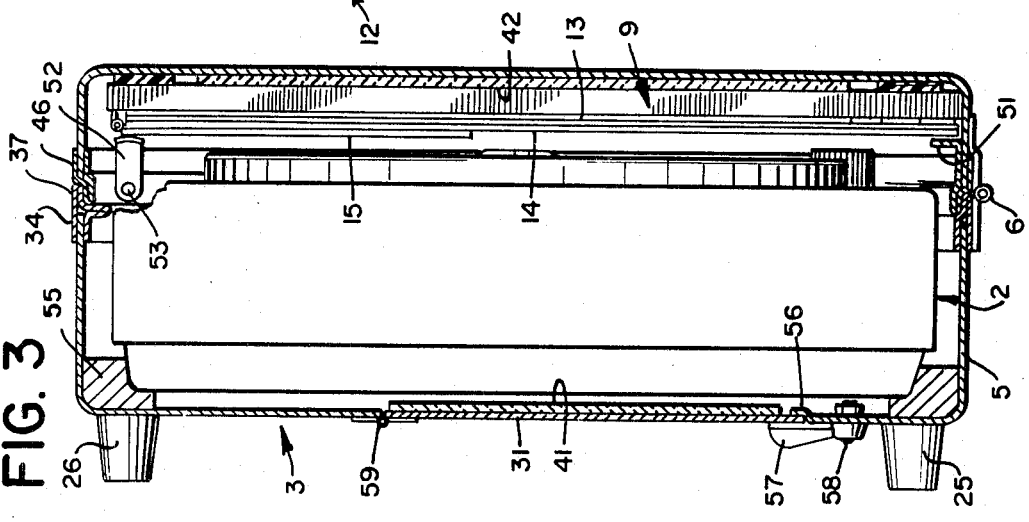

ABSTRACT OF THE DISCLOSURE

The disclosure describes a portable viewing device having a collapsible viewing screen assembly and a carrying case suitable for carrying both the collapsed viewing screen assembly and a conventional projector suitable for use with the viewing device, the case forming a mounting for the screen assembly and containing reflecting means for directing a projected image toward the screen assembly.

---

This invention relates to viewing devices of the type which may be used for viewing photographic slides or film. More specifically, this invention relates to a simple, inexpensive portable viewing device which is particularly suitable for making visual aids presentations.

Viewing apparatus for making visual aids presentations should preferably be lightweight and compact for easy portability, and should also be capable of being quickly set up before a lecture or meeting, should not take up too much space when set up, and should be capable of being quickly taken down afterward. It will therefore be apparent that the conventional combination of a slide projector or a motion picture projector and a separate front-projection screen is not particularly well suited for making visual aids presentations. The screen is heavy and cumbersome to carry and relatively difficult to set up, and the screen and projector must be properly aligned and adjusted in order to compensate for the inevitable variations in the distance between the viewing screen and the projector and the relative heights of the viewing screen and the projection platform. In addition, the long throw between projector and the screen is disadvantageous in that it makes it difficult for the operator to both control the projector and indicate items of interest on the screen.

One type of prior art viewing apparatus which is better suited to the purpose of making visual aids presentations is the well-known table-top viewing apparatus including a rear-projection screen and a built-in slide or motion picture projector mechanism. This type of viewing apparatus can generally be readily set up for operation on any convenient desk or table-top. In addition, some table-top viewers have been made at least partially collapsible for more convenient portability and storage. However, because they include built-in special purpose projection apparatus, the table-top viewers of the prior art are generally relatively expensive. Further, because the projection apparatus is built in, it is susceptible of only one use. Hence, if it is also desired to have a conventional front-projection capability, additional slide or motion picture projection apparatus is required.

It is therefore an object of the present invention to provide a portable rear-projection viewer suitable for use with conventional projection apparatus of the type which is normally used with a front-projection viewing screen.

It is also an object of this invention to provide a collapsible portable viewer which can be easily set up for operation.

It is another objection of this invention to provide a collapsible portable viewer incorporating its own carrying case.

It is a further object of this invention to provide a collapsible portable viewer incorporating a carrying case which is also capable of carrying a projector suitable for use with the viewer.

It is still another object of this invention to provide an inexpensive collapsible portable viewer which is well adapted to making visual aids presentations.

According to the above and other objects, the preferred form of the present invention provides a portable viewer comprising a collapsible viewing screen assembly and a hinged carrying case which forms a part of the optical system between the screen and projector. The viewing screen assembly is mountable around the edges of the bottom portion of the carrying case and serves to support the top portion of the carrying case at an angle to the bottom portion. A large mirror is mounted on the interior surface of the top portion of the carrying case and a small mirror is mounted on a trap door in the bottom portion of the carrying case. Means are provided for raising the bottom portion of the carrying case above the projection platform to permit the trap door to open downward at an angle so that light rays from an independent projector will be reflected from the small mirror to the large mirror to the rear of the projection screen. The viewing screen assembly is collapsible for storage within the carrying case which if desired, may be sufficiently large to accommodate the projector also. In addition, the top portion of the carrying case may be provided with a separate, exteriorally opening compartment for storing motion picture film reels or slide magazines. An advantage of the viewing apparatus of the present invention is that it provides a large image from a conventional projection lens without requiring the projector to be placed a large distance from the viewing screen.

Other objects and advantages of the present invention will be apparent from the following detailed description and accompanying drawings which set forth the principles of the invention and a preferred embodiment thereof.

In the drawings:

FIG. 1 is a perspective view of the portable viewing apparatus of the present invention and a conventional slide projector positioned for use therewith;

FIG. 2 is a cross-sectional view of the viewing apparatus of the present invention assembled for operation;

FIG. 3 is a cross-sectional view of the apparatus of the present invention showing the viewing screen assembly and the slide projector stored within the carrying case;

FIG. 4 is a perspective view of the viewing screen assembly collapsed for storage within the carrying case;

FIG. 5 is a perspective view of the viewing screen assembly erected for mounting on the bottom portion of the carrying case;

FIG. 6 is a side-elevational view of the carrying case partly broken away to show the separate exteriorally opening compartment for storing a slide magazine;

FIG. 7 is a fragmentary side-elevational view of a modified form of the viewing apparatus of the present invention; and FIG. 8 is a fragmentary front-elevational view of the viewing apparatus of FIG. 7.

Referring in greater detail to FIG. 1, there is shown a preferred embodiment, generally designated 1, of the collapsible portable viewing apparatus of the present invention and a slide projector, generally designated 2, positioned for use with viewing apparatus 1. Viewing apparatus 1 incorporates a carrying case, generally designated 3, which may be of conventional appearance as shown in FIG. 1. Carrying case 3 includes a top or cover portion 4 and a bottom portion 5 which are preferably hinged together, as by a piano-type hinge 6 as shown in FIG. 2. Carrying case 3 is preferably made of some relatively rigid material such as, for example, a fiber board or similar material. If desired, carrying case 3 may be provided with suitable latches 7 and a carrying handle 8 as shown in FIG. 1. Mountable on the bottom portion 5 of the carrying case is the viewing screen assembly generally designated 9, which is carried within the case except when the use. Viewing screen assembly 9 includes a rear-projection translucent viewing screen 11 which may be made of a sheet of glass preferably having a smooth front surface and a ground or satin-finish rear surface for well-known light diffusing purposes. Viewing screen 11 is mounted in a frame 12 to which are joined (as by hingeing) movable opaque side panels 13 (not shown in FIG. 1) and 14 and an opaque top panel 15. These panels 13, 14 and 15 serve to exclude light from the enclosure formed by the cover and base of carrying case 3 and the viewing screen assembly 9. In addition, side panels 13 and 14 support top portion 4 at the proper angle to bottom portion 5 of the carrying case for reasons which will be explained in greater detail hereinafter.

The entire viewing apparatus 1 is supported in a raised position above the platform, desk or table on which it rests by suitable means, such as detachable legs 21 (not shown), 22, 23 and 24 which preferably screw or slip into sockets 25 (not shown), 26, 27 and 28 which project from the bottom portion 5 of the carrying case. These sockets may form resting feet for the case. It will be appreciated, however, that the viewing apparatus of the present invention is not limited to any particular type of supporting legs. For example, folding legs may be employed as is described in greater detail in connection with FIGS. 7 and 8. The legs 21–24 are of such a length that trap door 31 which is hinged to the bottom portion 5 of the carrying case is permitted to open downward at a predetermined angle and rest on the table, or other platform, for reasons which will be explained in detail in connection with FIG. 2.

Referring now to FIG. 2 of the drawing, there is shown a side elevational view, in cross-section, of the viewing apparatus 1 of the present invention. The lower edge 32 of frame 12 of viewing screen 11 rests on flange 33 which projects inward from the front edge 34 of the bottom portion 5 of the carrying case. The bottom edge 35 of side panel 13 rests on a flange 36 which projects inward from the side edge of bottom portion 5 of the carrying case. Similarly, the bottom edge of side panel 14 (not shown) rests on a corresponding flange projecting inward from the opposite side of the bottom portion 5 of the carrying case. A rim 37 projects upward from the edges of the bottom portion 5 of the carrying case to retain the bottom edges of the viewing screen frame 12 and side panels 13 and 14 in alignment with the edges of the bottom portion 5 of the carrying case.

The rearward edges of side panels 13 and 14 are contoured to support top portion 4 at the proper angle to the bottom portion 5 of the carrying case so that light rays emanating from projector 2 and reflected from small mirror 41 mounted on trap door 31 will be reflected from large mirror 42 mounted on the interior surface of top portion 4 of the carrying case to impinge substantially normally upon the rear surface of projection screen 11. For example, the rearward edge 43 of side panel 13 fits inside the edge 44 of top portion 4 to support top portion 4 at the proper angle to bottom portion 5 of the carrying case. Opaque top panel 15 is hinged to the top edge 45 of the frame 12 of viewing screen 11 and rests on the front edge 46 of top portion 4 of the carrying case in order to complete the light-excluding enclosure.

Referring now to FIG. 3 of the drawings, there is shown a side elevational view in cross-section of the viewing apparatus of the present invention with the viewing screen assembly 9 and slide projector 2 stored within carrying case 3 for easy portability. The viewing screen assembly 9 comprising viewing screen 11, side panels 13 and 14, and top panel 15 folds into a flat, compact unit for easy storage within the top portion 4 of the carrying case. One end of the folded viewing screen assembly 9 is retained in position by flange 51 which projects inward from the side of top portion 4 adjacent hinge 6. The other end of the folded viewing screen assembly 9 is retained in position by suitable means, such as a retaining member 52 which pivots on a stud 53 projecting from the side of top portion 4 near front edge 46. If desired, another retaining member may be provided at the opposite side of top portion 4.

Slide projector 2 fits within the bottom portion 5 of the carrying case as shown in FIG. 3. Mounting pieces 55, which are preferably made of rubber or a similiar material, support the base of projector 2 a small distance above the bottom of the carrying case in order to prevent accidental damage to mirror 41 during transportation. Trap door 31 is suitably retained in a closed position as by lip 56 at the edge of opening 40 and latching piece 57 which pivots about its retaining bolt 58. Sockets 25 and 26 support the carrying case in a slightly raised position to prevent damage to latching piece 57 and hinge 59 of trap door 31.

FIG. 4 shows the viewing screen assembly 9 in its collapsed condition, ready for storage in carrying case 3. Side panels 13 and 14 are folded inward on their hinges to lies over viewing screen 11 (not shown). Top panel 15 is folded downward over panel 14 to form a flat, compact package which may readily be stored within the top portion 4 of the carrying case as explained above in connection with FIG. 3.

FIG. 5 shows the viewing screen assembly 9 in its erected position, ready for mounting about the edges of bottom portion 5 of the carrying case as explained in greater detail in connection with FIGS. 1 and 2. Side panels 13 and 14 extend rearward from the frame 12 at approximately right angles to viewing screen 11. Top panel 15 is shown resting on the top edges of side panels 13 and 14.

FIG. 6 is a side elevational view of a modified form of carrying case, generally designated 61, partially broken away to show the separate, exteriorly opening compartment 62 for holding a circular slide magazine 63. A circular flange 64 extends upward from inner wall 65 of compartment 61 to receive slide magazine 63 and hold it in position. A trap door 66 is hinged at 67 to the exterior wall 68 of compartment 61 to provide access to the slide magazine 63. Trap door 66 is retained in its closed position by lip 69 and latching piece 70 which pivots on bolt 71. If desired, the inner surface of trap door 66 may be provided with a sheet of resilient material 72 such as, for example, sponge rubber, in order to securely retain slide magazine 63 in position and prevent damage thereto. While compartment 61 has been described in connection with a circular slide magazine, it will be appreciated that compartment 61 may equally well be adapted to carrying other forms of slide magazines and/ or reels of motion picture film or other accessories for use with the present equipment.

FIG. 7 is a fragmentary side-elevational view of a modified form of the viewing apparatus of the present invention in which the ends of the lower edge 32 of the frame 12 of viewing screen 11 are pivotally mounted adjacent the front edge 34 of the bottom portion 5 of the carrying case, and in which the carrying case is supported by folding legs such as for example leg 73. More particularly, each end of the lower edge 32 of frame 12 is pivotally mounted to a support member such as member 74 by means of a pivot pin such as pin 75. Support member 74 may be suitably mounted on the bottom portion 5 of the carrying case adjacent the front edge 34 thereof as, for example, by means of rivets 76 and 77 shown in FIG. 8. Support member 74 projects upwardly from bottom portion 5 of the carrying case to permit the viewing screen assembly to be folded into its collapsed condition as shown in FIG. 4 and then pivoted downward about pivot pin 75 to lie substantially flat on top of a projector stored in the bottom portion 5 of the carrying case. The top portion 4 of the carrying case may then be swung downward to its closed position and latched for transportation or storage.

It is noted that the collapsed viewing screen assembly and the support members on which it is pivoted fit within the top portion 4 of the carrying case in its closed position. It is also noted that in the modified viewing apparatus shown in FIGS. 7 and 8, the top portion 4 may, if desired, be made considerably deeper than shown in FIG. 3 in order to accommodate a slide magazine for storage within the carrying case on top of the folded viewing screen assembly.

The folding legs of the modified form of viewing apparatus shown in FIGS. 7 and 8 may, if desired, be pivotably mounted on the bottom portion 5 of the carrying case. For example, leg 73 is pivotally mounted by means of a suitable pivot pin 78 on a flange 79 extending from the bottom portion 5 of the carrying case. Leg 73 folds into position 80 alongside flange 79 for convenience in carrying and storage.

In practical use, the projector 2 and viewing screen assembly 9 are stored within carrying case 3 (as shown in FIG. 3) for transportation or storage. Alternatively, a carrying case having a separate compartment 62 for carrying accessories such as slide magazine 63 (shown in FIG. 6) may be employed. To set up the viewing apparatus for making a visual aids presentation, the carrying case 3 is opened and the projector 2 and also the viewing screen assembly 9, if detachable, are removed. Detachable legs 21–24 are then screwed or slipped into sockets 25–28 in order to raise the bottom portion 5 of the carrying case above the projection platform as shown in FIGS. 1 and 2. The legs are simply pivoted into position in the case of the modified form of viewing apparatus shown in FIGS. 7 and 8. The viewing screen assembly 9 is then unfolded from the flat compact collapsed condition (shown in FIG. 4) to the erected condition (shown in FIG. 6). The lower edges of the viewing screen frame 12 and the side panels 13 and 14 are then mounted along the front and side edges of the bottom portion 5 of carrying case 3 as explained in greater detail in connection with FIG. 2. If the viewing screen assembly 9 is pivotally mounted adjacent the front edge of the bottom portion 5 of the carrying case 3, as shown in FIGS. 7 and 8, it may be simply pivoted to its upright condition and side panels 13 and 14 may be unfolded to rest along the side of the bottom portion 5 of the carrying case. The top portion 4 of carrying case 3 is then swung over to rest on the top edges of side panels 13 and 14, and top panel 15 of viewing screen assembly 19 is swung down to the position shown in FIG. 2 to complete the light-excluding enclosure. Trap door 31 may then be opened and projector 2 may be moved into position for operation as shown in FIGS. 1 and 2.

In operation, the viewing apparatus 1 does not take up much space and is well suited to making visual aids presentations in that the projector 2 is located only a short distance from viewing screen 11 so that the operator may readily simultaneosuly control the projector 2 and indicate items of interest on screen 11.

To disassemble the viewing appartus, viewing screen assembly 9, if detachable, is removed from bottom portion 5 of carrying case 3 and folded into a flat package as shown in FIG. 4. The trap door 31 is closed and the legs are unscrewed from their sockets or folded into their storage positions. The projector 2 is then placed within carrying case 3, viewing screen assembly 9 is pivoted or placed into its storage position and carrying case 3 is closed for easy transportation or storage.

Although the viewing apparatus of the present invention has been described by reference to a preferred embodiment including a carrying case adapted to carry a particular type of slide projector, it will be apparent to those skilled in the art that the principles of the present invention encompass viewers including carrying cases adapted to carry other types of slide projectors or motion picture film projectors, and carrying cases which are adapted to carry only the collapsed viewing screen assembly.

It will also be appreciated that, while the vertical orientation of the viewing screen 11 shown in FIGS. 1 and 2 is particularly advantageous for the purpose of making visual aids presentations, the principles of the present invention encompass viewers in which the viewing screen may be at an angle to the vertical.

Similarly, although the viewing apparatus of the present invention has been illustrated by reference to a preferred embodiment in which the mirrors are shown in particular angular relationships to the bottom of the carrying case and the viewing screen, it will be appreciated by those skilled in the art that other, different angular relationships may be employed so long as the light from the projector is reflected so as to impinge substantially normally upon the rear surface of the viewing screen. Further, although the trap door 31 is hinged to the bottom portion 5 of the carrying case of the preferred embodiment in such a way that mirror 41 faces to the rear when the trap door 31 is open, it will be appreciated that trap door 31 might be hinged so that mirror 41 faces forward when the trap door is open.

It will be apparent to those skilled in the art that other different modifications and adaptations of the present viewing apparatus may be made without departing from the spirit and scope of the invention as set forth with particularity in the appended claims.

What is claimed is:

1. A collapsible portable viewer comprising:
   a carrying case including a top portion and a bottom portion having a front edge, a rear edge and two side edges, said top portion being mountable at an angle to said bottom portion along the rear edge thereof;
   a viewing screen, the bottom edge of said viewing screen being mountable on and substantially coextensive with the front edge of said bottom portion of said carrying case;
   an opaque side panel movably associated with and substantially coextensive with each side edge of said viewing screen, the bottom edges of said side panels being mountable on and substantially coextensive with the side edges of said bottom portion;
   a first reflector mounted on the interior surface of said top portion;
   a pivotably movable section in said bottom portion;
   a second reflector mounted on the interior surface of said pivotably movable section; and
   collapsible means for supporting said carrying case at such a height above a supporting surface that said pivotably movable section can open downward and engage the supporting surface at a predetermined angle so that light rays projected substantially horizontally toward said second reflector will be reflected from said second reflector to said first reflector and from said first reflector to said viewing screen for viewing, said viewing screen and said side panels being collapsible for storage within said carrying case.

2. The collapsible portable viewer of claim 1, wherein the rear edges of said side panels are contoured to support said top portion at an angle to said bottom portion of said carrying case.

3. The collapsible portable viewer of claim 1, further comprising an opaque top panel movably associated with and substantially coextensive with the top edge of said viewing screen and extending to the front edge of said top portion so as to substantially exclude light from the enclosure formed by the top and bottom portions of said carrying case, said viewing screen, said side panels and said top panel.

4. The collapsible portable viewer of claim 3, further comprising means for retaining said viewing screen, said side panels and said top panel adjacent the interior surface of the top portion of said carrying case for storage.

5. The collapsible portable viewer of claim 4, wherein said carrying case is sufficiently large to accommodate a projector suitable for use with said viewer.

6. The collapsible portable viewer of claim 5, further comprising a compartment formed exteriorly of said top portion of said carrying case for accommodating a film magazine for use with said projector.

7. A collapsible portable viewer comprising:
 a carrying case including a top portion and a bottom portion having a front edge, a rear edge and two side edges, said top portion being mountable at an angle to said bottom portion along the rear edge thereof;
 a viewing screen, the bottom edge of said viewing screen being mountable along the front edge of said bottom portion;
 a first reflector mounted on the interior surface of said top portion;
 a pivotably movable section in said bottom portion;
 a second reflector mounted on the interior surface of said pivotably movable section; and
 collapsible means for supporting said carrying case at such a height above a supporting surface that said pivotably movable section can open downward and engage the supporting surface at a predetermined angle so that light rays projected substantially horizontally toward said second reflector will be reflected from said second reflector to said first reflector and from said first reflector to said viewing screen for viewing.

8. The collapsible portable viewer of claim 7, further comprising means extending from the top edge of said viewing screen to the front edge of said top portion and from the side edges of said viewing screen to the side edges of said top and bottom portions for substantially excluding light from the enclosure formed thereby, said viewing screen and said means for excluding light beam collapsible for storage within said carrying case.

9. The collapsible portable viewer of claim 7 wherein the bottom edge of said viewing screen is pivotally mounted adjacent the front edge of said bottom portion.

10. The collapsible portable viewer of claim 9 wherein the bottom portion of said carrying case is capable of accommodating a projector and wherein said viewing screen is pivotally mounted so as to be positionable adjacent the top surface of said projector.

11. The collapsible portable viewer of claim 7 further comprising a plurality of support legs pivotally mounted to the bottom portion of said carrying case.

References Cited
UNITED STATES PATENTS

| | | | |
|---|---|---|---|
| 1,283,590 | 11/1918 | Stavenhagen | 353—73 |
| 2,150,992 | 3/1939 | Scott | 353—73 |
| 2,424,339 | 7/1947 | Stechbart et al. | 353—73 |
| 2,476,494 | 7/1949 | Jones et al. | 353—78 X |
| 3,247,762 | 4/1966 | Peters | 353—73 |

WILLIAM D. MARTIN, Jr., Primary Examiner

U.S. Cl. X.R.

353—78